M. ARENDT, C. W. BURROWS, AND H. ROSENMEYER.
PROTECTING MEANS FOR ELECTRICAL SYSTEMS.
APPLICATION FILED JULY 31, 1920.
1,434,728.
Patented Nov. 7, 1922.
3 SHEETS—SHEET 3
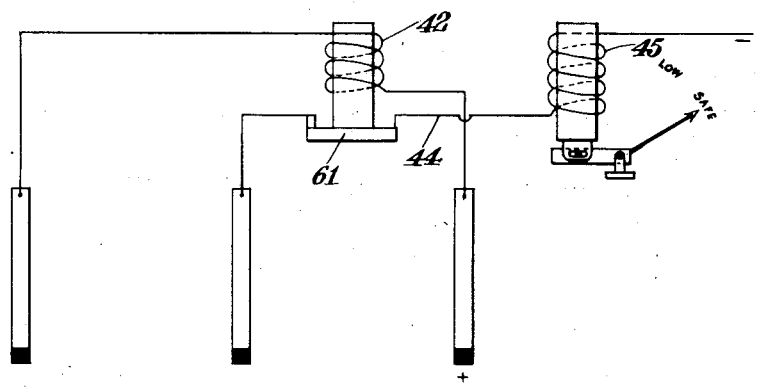
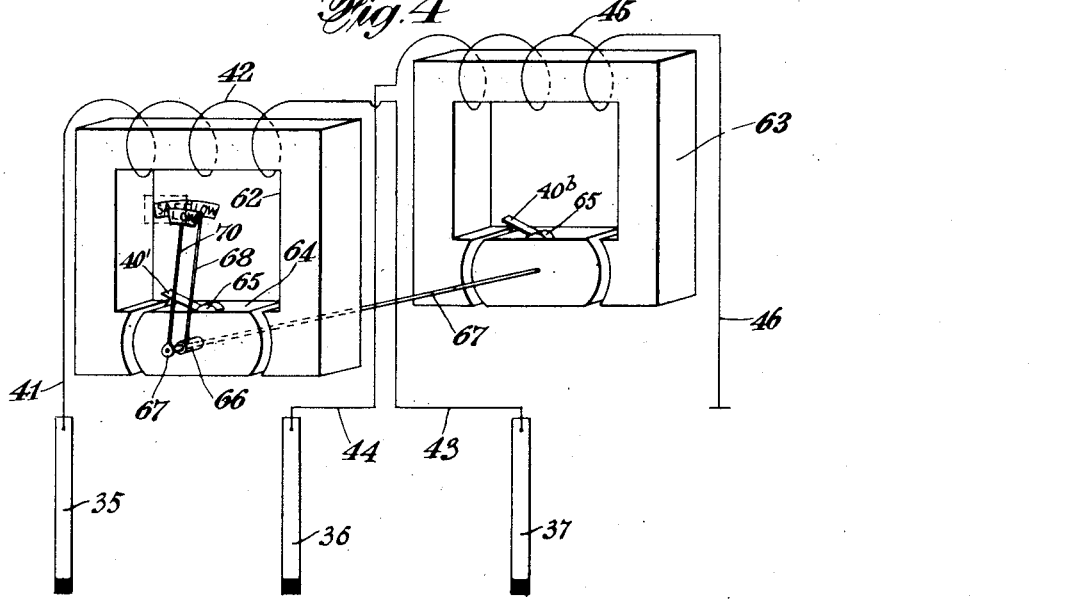
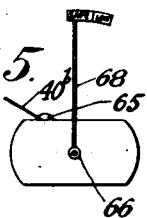
INVENTORS
Morton Arndt
Charles H. Burrows
Herbert Rosenmeyer
BY
Kenyon & Kenyon
his. ATTORNEYS Patented Nov. 7, 1922.

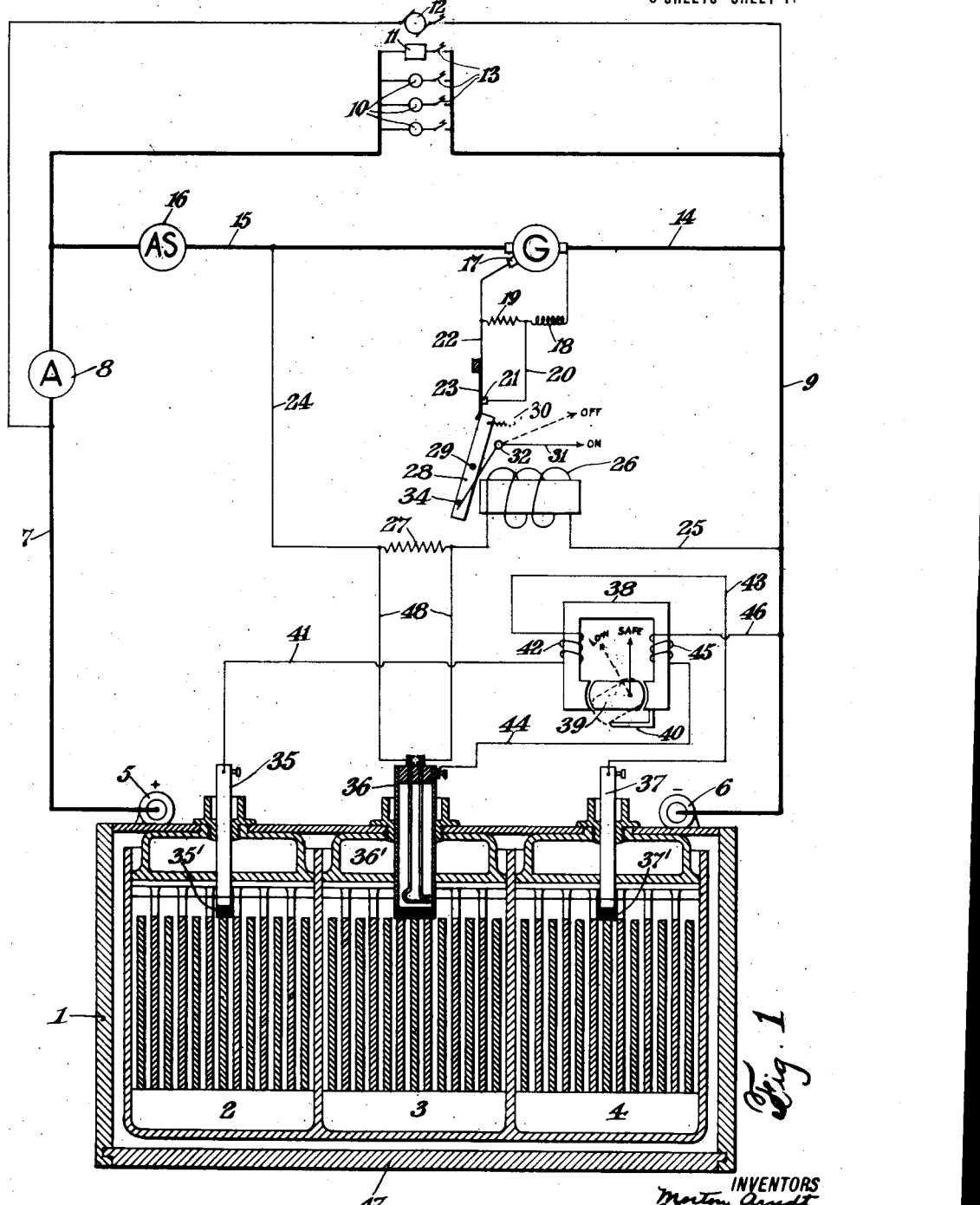

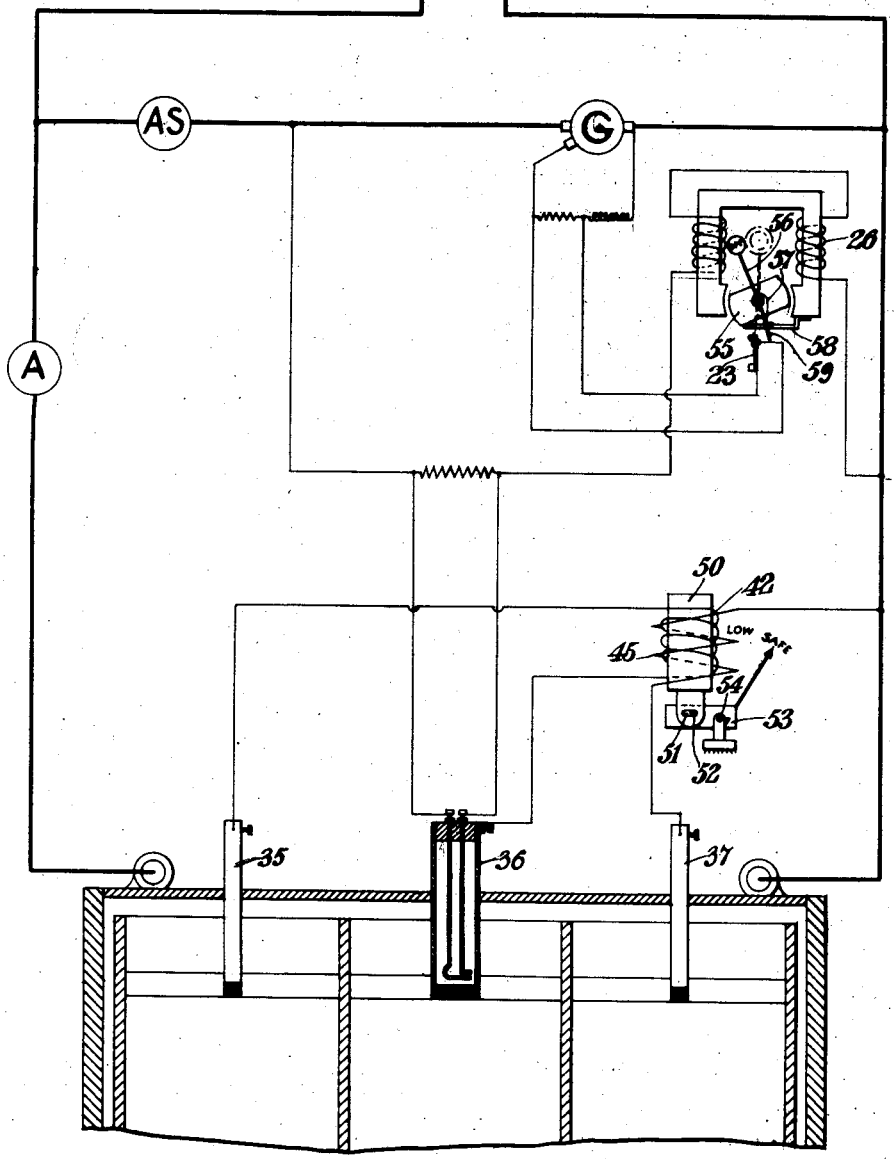

1,434,728

UNITED STATES PATENT OFFICE.

MORTON ARENDT, CHARLES W. BURROWS, AND HERBERT ROSENMEYER, OF NEW YORK, N. Y., ASSIGNORS, BY MESNE ASSIGNMENTS, TO BATTERY APPLIANCE CORPORATION, OF NEW YORK, N. Y., A CORPORATION OF DELAWARE.

PROTECTING MEANS FOR ELECTRICAL SYSTEMS.

Application filed July 31, 1920. Serial No. 400,472.

*To all whom it may concern:*

Be it known that we, MORTON ARENDT, a citizen of the United States, and resident of New York, county of New York, and State of New York, CHARLES W. BURROWS, a citizen of the United States, and resident of New York, county of Richmond, and State of New York, and HERBERT ROSENMEYER, a citizen of the United States, resident of New York, county and State of New York, have invented certain new and useful Improvements in Protecting Means for Electrical Systems, of which the following is a specification.

Our invention relates to means for protecting the state of operation of electrical systems and particularly to devices for protecting the battery, generator, and electrical circuits of motor vehicles, primarily to preserve the life and capacity of the battery.

In motor vehicles of the present day the electrical system comprises a storage battery and a generator and devices supplied by them. The storage battery acts as a reservoir and controlling element for the generator output, supplying the necessary energy when the generator is not running. Among the devices ordinarily supplied by the system are a starting motor, ignition devices and lamps as well as other auxiliary devices, depending upon the design and appointments of the vehicle. The generator is primarily designed to recharge the battery and maintain it in a certain state of charge, and it is well known that in charging the battery the rate of flow of the current and the voltage at which the current is supplied must be carefully graduated in order to prevent injury to the battery and devices supplied by the system. To this end the generator is provided with means for controlling the generator output. One of the most common means for effecting such control is the use of a third brush in the generator to which one terminal of a shunt-field is connected. Such a controlling device maintains the current output of the generator constant within limits, the voltage being variable according to the resistance and state of charge of the battery. If the battery should become disconnected, the resistance across the generator would rise and the voltage would increase so rapidly that damage would be done to the circuit and auxiliary devices supplied by the system, and it is one object of our invention to provide means for protecting against such results.

Where the current output of the generator is maintained at a constant value the voltage will rise as the battery becomes charged and after it is fully charged the same amount of current will be supplied to it, particularly where long tours are made in the day time and over-charging of the battery occurs. One of the results of this over-charging is an over-heating of the battery resulting in an expansion of the plates causing loss of active material. Another result is the electrolysis of the electrolyte, or gassing, which causes a rapid loss of the electrolyte, lowering the fluid level in the cells and exposing the plates to the air. Exposure to the air results in the hardening and loss of capacity of the plates. The low level of the electrolyte is also objectionable in that it increases the current density on the plates of the battery and also reduces its capacity. The low level may also be caused by ordinary evaporation through a period of time or by reason of high temperature of the battery or by reason of leakage of the jars. When the electrolyte level is low charging of the battery even at the normal rate may cause heating. An object of our invention is to provide means for controlling the output of the generator which is dependent upon the temperature of the cell inasmuch as the temperature of the cell is dependent upon the electrolyte level, the state of charge, and the rate of charge. Another object of our invention is to provide means for indicating the state of the electrolyte level and also for indicating the state of the generator regulation.

The constant current regulator causes an increase in voltage in order to maintain a constant flow of current when the resistance varies and therefore sulphated plates, the low level of the electrolyte, overcharge of the battery, and broken battery connections will all result in the great increase in the generator voltage in its attempt to maintain a current and destruction of electrical devices connected to the system will ensue. It is an object of our invention to provide means for regulating the output of the generator, particularly by altering the voltage thereof, which will be dependent upon the voltage output of the generator and which will also be dependent upon the temperature of the battery inasmuch as the temperature is dependent upon the rate of charge, condition of the plates, state of charge, and state of the electrolyte-level.

It may be that in a particular installation the circuits are protected by fuses and circuit-breakers to prevent them from being burnt out under the conditions above described but the burning out of such fuses or the operation of such circuit breakers causes the electrical system to become inoperative and the motor vehicle may stop at an inopportune moment. It is an object of our invention to provide a regulating means for the generator to forestall the operation of fuses and circuit breakers and which will leave the system intact, the generator producing enough current to carry the normal load, or at least, some part of it.

Other and further objects and advantages of our invention will be apparent from the following description and will be pointed out in the appended claims.

In the drawings in which like reference characters indicate similar parts,

Fig. 1 is a diagrammatic showing of the electrical system for a motor vehicle embodying our invention;

Fig. 2 is a diagrammatic showing of an electrical system for a motor vehicle embodying our invention and including variations of the protecting and indicating devices;

Figs. 3 and 4 are diagrammatic showings of modifications of level indicating devices; and Fig. 5 is a detail view.

Referring to Fig. 1, the battery 1 comprises three cells 2, 3 and 4 having a positive terminal 5 and a negative terminal 6. The main line wire 7 connected to the positive terminal includes the ammeter 8. The main line wire 9 is connected to the negative terminal. Between these main line wires are connected lamps 10, ignition devices 11 and a starting motor 12, each of which is provided with a switch 13 as indicated. Between the battery and the devices supplied by the system the generator G is connected by the wires 14 and 15. In the wire 15 is connected the usual automatic switch 16 which connects the generator to the system when its voltage equals or exceeds the battery voltage and disconnects it when the generator voltage falls so as to prevent discharge of the battery through the generator when the generator is not running. The generator is provided with a third brush 17 and between this brush and one of the main brushes of the generator is connected a shunt field 18 having in series with it a resistance 19. Around this resistance a shunt is formed by means of the conductor 20 leading to the contact 21 and the conductor 22 leading to the spring contact 23. The operation of contacts of this shunt will be hereinafter described. Across the terminals and the generator, by means of the conductors 24 and 25, there is connected a magnet coil 26 having in series with it the resistance 27. This magnet is connected across the generator so that its operation will not be interfered with by the operation of the automatic switch 16. In case a battery connection becomes broken or a jar leaks and a cell becomes dry or the battery becomes greatly overcharged or its resistance is increased by the low level of the electrolyte or sulphating of the plates, the voltage of the generator will be built up to overcome these conditions and a burning out of the electrical devices might occur but an armature 28 is pivoted at 29 in front of the core of the magnet coil 26 and is held away from that core by the spring 30 and the tension of the spring contact 23, and as the voltage rises the magnet is energized with sufficient strength to attract the armature 28, swinging it about its pivot and flexing the spring contact 23, opening the shunt around the field resistance 19. This resistance is proportioned to reduce the generator output to an amount sufficient to carry a normal load or part of it, but insufficient to damage the electrical circuits. An indicator for the generator regulator is provided which may consist of any device operated by the force of the magnet 26, such as an arm 31 pivoted at 32 and carrying a finger 33 upon which acts the pin 34 on the armature 28, so that when the armature 28 is drawn toward the core of the magnet 26 the indicating arm will swing to a position indicating that the main charging current is "off."

Now the charging of the battery should also be discontinued or reduced if it has been carried to a point where the battery is fully charged and excessive gassing of the electrolyte is taking place and lowering the level of the electrolyte, increasing the current density upon the plates and also heating up the battery and thereby causing further reduction in the electrolyte level, and we have therefore provided means for indicating the state of the electrolyte level and for taking advantage of these conditions to vary the sensitivity of the means for regulating the generator output. Through the filler caps of the respective cells there are inserted metallic electrodes 35, 36 and 37, which are provided at their lower ends respectively with the insulated members 35', 36' and 37' to insulate them from the plates of the cell and to bring their conductive portions at that point above the plates which constitutes the minimum proper level above the plates of the electrolyte in the cells.

In the embodiment shown in Fig. 1 the means for indicating the state of the electrolyte level consists in a magnet core 38 having two arms between which there is pivoted an armature 39 biased, as for example, by eccentric mounting to move from a position wherein a "safe" indication will be given. To this armature is attached an indicating arm which, when the armature 39 is drawn up to position between the poles of the magnet 38, will indicate a safe level for the electrolyte, and when the armature drops down against the stop 40 the indicating arm will indicate that the level is low. In order that this indication will apply to all cells of the battery the armature core 38 is provided with cumulative windings connected to the electrolytes of the various cells in such a manner that the failure of one of such connections will cause an operation of the indicator.

In the embodiment shown in Fig. 1 the electrode 35 is connected by the conductor 41 to the coil 42, and the other end of the coil 42 is connected by the conductor 43 to the electrode 37. The electrode 36 is connected by the conductor 44 to the coil 45, the other terminal of which is connected by the conductor 46 preferably to the negative terminal of the battery. If the electrolyte level in either cell 2 or cell-4 falls so low that the electrolyte is no longer in contact with the conductive portion respectively of the electrodes 35 and 37, the energization of the coil 42 will cease and the indicator will operate to indicate low, or if the electrolyte in cell 3 falls below the conductive portion of the electrode 36 the flow of current in the coil 45 will cease and the indicator will operate, because coils 42 and 45 are accumulative in effect and the effect of both is necessary in order to bring the arm of the indicating device to a position to indicate "safe." Different modifications of the manner of employing the two coils 42 and 45 connected to the electrolyte and terminals of the cell as above described will be hereinafter disclosed. In order that the circumstances arising by reason of lowered electrolyte level, and in order that the circumstances causing the lowered electrolyte level may be taken advantage of in controlling the generator output, the electrode 36 includes and carries into the cells a thermostatic switch 47, the terminals of which are connected by the conductors 48 across the resistance 27 in the circuit of the generator regulator magnet 26. The thermostatic device is so arranged that when the temperature of the battery rises by reason of the low electrolyte level, increased resistance of the battery, or overcharge thereof under normal conditions of the cells, the thermostatically controlled contacts will be closed thus closing the shunt across the resistance 27. From the structure described it will be apparent that if the battery is cool and the resistance 27 is not shunted, the resistance in the field circuit will remain shunted until the battery is charged because the resistance of the coil 26 is so high that the normal charging voltage will not cause it to act to open a shunt around the resistance 19 but if the resistance of the battery increases for any of the reasons stated or a conductor becomes broken, the generator voltage will rise sufficiently to overcome the effect of the resistance 27 and the generator regulator will operate to reduce the generator voltage. On the other hand, if the battery becomes heated to approximately 110° F. for any reason, such as those above stated, the resistance 27 will be shunted and the sensitivity of the generator regulator will be increased and the charging voltage will cause operation of the generator regulator. If the battery becomes heated sufficiently to shunt the resistance 27 and is still in condition to receive its proper charge, that is, if the electrolyte-level is high enough to prevent any unusual rise of resistance of the battery, the charging voltage will not rise high enough to cause the operation of the generator regulator until the battery is sufficiently charged to cause a rise in voltage high enough to operate the regulator even when the resistance 27 is not shunted.

From the foregoing it will be apparent that we have provided a protective device for the generator, the battery, and the circuits supplied thereby and means for indicating the state of the electrolyte level which bears an important relation to the condition of the entire system as above stated and also means for indicating the state of generator regulation whereby the operation of our protective system is indicated.

The system diagrammatically shown in Fig. 2 is in general respects similar to that shown in Fig. 1 except that variations are made in the form of the indicator for the state of the electrolyte-level and in the generator regulator. The two coils 42 and 45 of the indicator for the state of the electrolyte-level are connected to the various electrodes and terminals of the battery as in the arrangement shown in Fig. 1 but both coils surround the same core 50 forming a solenoid. The core 50 has formed in its end a lateral slot 51 in which is positioned a pin 52 carried on a lever 53 which is supported on a fixed pivot 54. Attached to the lever 53 is an indicating arm which moves from the indication of "safe" to the indication that the electrolyte is "low" whenever the cumulative effect of the two coils 42 and 45 is insufficient to hold the core 50 in its upward position.

The generator regulator comprises an electro-magnet 26. Between the poles thereof is mounted at its center of balance an armature 55 which carries an arm 56 bearing a signal upon which appears the word "Off." The armature normally rests in the position shown and is held in that position by the assistance of the spring 57 which may be mounted upon the stop 58 which limits the movement of the armature 55. When a condition arises under which the output of the generator should be decreased, the armature is drawn up to the top position and the signal "off" is brought into view. At the same time the finger 59 comes in contact with the spring contact member 23 and opens the shunt around the resistance 19 of the generator field. In this construction the vibration of the vehicle will not cause the normal voltage to decrease the generator voltage, but on the other hand, the regulator will operate when the voltage reaches the predetermined point.

In Fig. 3 a variation of the indicator for the state of electrolyte-level is shown, and the coils 42 and 45 connected as shown in Figs. 1 and 2 are upon separate cores. The coil 42 controls a switch 61 inserted in the conductor 44 of the magnet 45. The magnet 45 operates an indicator of the type shown in Fig. 2. In this construction, instead of having a cumulative effect of the coils operate the indicator, one coil controls the circuit of the other so that there is the same necessity for the energization of both coils as there is in the construction shown in Figs. 1 and 2.

In Fig. 4 there is shown a variation in the construction of the electrolyte-level indicator in which two cores 62 and 63 are used. The coil 42 is wound on the core 62 and the coil 45 on the core 63. Each coil controls an armature 64 which is biased to move from the position shown, in which it is held by energization of its respective coil, by some such means as a counter-weight 65. One armature 64 has a tubular shaft 66 and the other armature has a shaft 67 extending through the tubular shaft. The tubular shaft carries upon it an arm 68, upon which is a signal bearing the legends: "Safe" and "Low." When the coil 42 is energized the armature will be in position so that the word "Safe" appears. In case the coil 45 is deenergized the armature will swing to bring the word "Low" into position to be observed. If the coil 45 is deenergized the arm 70 on its respective armature will swing over to carry the signal "low," mounted upon the arm 70, into position to be observed, thus in case either coil 42 or 45 is deenergized the signal "low" will be brought into view. This construction has been developed to prevent the indicator from becoming positioned half way between the "safe" and "low" indications in the event that any of the cells of the battery becomes low in voltage. Each armature 64 is provided with a stop 40' to cooperate with a magnet pole.

While we have described our invention in great detail in order to fully disclose it, we do not intend to be limited by the specific details described but intend that it shall be defined by the hereunto appended claims.

Having described our invention, what we claim as new and desire to secure by Letters Patent is:

1. In a battery charging and protective system, the combination of a battery, a charging generator, a resistance controlling the output of the generator, and means responsive to line voltage and to the temperature of the battery for regulating said resistance.

2. In a battery charging and protective system, the combination of a battery, a charging generator and circuit, a protective resistance associated therewith, and means responsive to both the temperature and voltage conditions of the battery for regulating said resistance.

3. An electrical system comprising a battery, a dynamo electric machine in circuit with said battery, a resistance associated therewith, and means responsive to both temperature and charging conditions for regulating said resistance.

4. In a battery system, the combination of a battery, a generator and charging circuit, a resistance associated therewith, a regulator for said resistance and means responsive to temperature conditions of the battery for hastening the operation of the regulator.

5. In combination with a system including a generator, storage battery and devices supplied thereby, means for regulating the generator output and means dependent upon the temperature of said battery for controlling the sensitivity of said regulating means.

6. In combination with a system including a generator and a storage battery, a circuit of variable sensitivity across the terminals of said generator, a regulator for said generator and controlled by said circuit and means dependent upon the temperature of said battery for controlling the sensitivity of said circuit.

7. In combination with a system including a generator and a storage battery, a circuit across the terminals of said generator and containing a resistance, a regulator for said generator and controlled by said circuit, a shunt for said resistance and a thermostat associated with said battery and controlling said shunt.

8. In combination with a system including a generator and a storage battery, means dependent upon temperature and voltage of said battery for regulating said generator.

9. In combination with a system including a generator and storage battery, means dependent upon temperature of said battery and upon the voltage of the generator for regulating said generator.

10. In combination with a system including a generator, storage battery and devices supplied thereby, means responsive to generator circuit conditions for automatically regulating the generator output and means dependent upon the temperature of said battery for controlling said regulating means.

11. The combination of a generator, a storage battery, a protective resistance associated with the generator, an automatic regulator responsive to generator circuit conditions for controlling said resistance including an electromagnet, a resistance associated with said electromagnet, and a thermostat responsive to temperature conditions of the battery for controlling the last-named resistance.

12. The combination of a generator, a storage battery, a resistance associated with the exciting field of the generator, a regulator for controlling said resistance including an electromagnet connected across the generator terminals, a resistance in series with the electromagnet, and a thermostat responsive to temperature conditions in the battery for controlling the last-named resistance.

In testimony whereof, we have signed our names to this specification.

MORTON ARENDT.
CHARLES W. BURROWS.
HERBERT ROSENMEYER.